US012760241B2

(12) United States Patent
Brinkø et al.

(10) Patent No.: US 12,760,241 B2
(45) Date of Patent: Oct. 13, 2026

(54) PROCESS OF PRODUCTION OF A FAT COMPOSITION COMPRISING A STEP OF ESTERIFICATION

(71) Applicant: AAK AB (PUBL), Malmo (SE)

(72) Inventors: Anne Brinkø, Viby (DK); Jeppe Lindegaard Hjorth, Aarhus (DK)

(73) Assignee: AAK AB (PUBL), Malmö (SE)

( * ) Notice: Subject to any disclaimer, the term of this patent is extended or adjusted under 35 U.S.C. 154(b) by 878 days.

(21) Appl. No.: 17/785,649

(22) PCT Filed: Dec. 18, 2020

(86) PCT No.: PCT/SE2020/051233
§ 371 (c)(1),
(2) Date: Jun. 15, 2022

(87) PCT Pub. No.: WO2021/126069
PCT Pub. Date: Jun. 24, 2021

(65) Prior Publication Data

US 2023/0076220 A1 Mar. 9, 2023

(30) Foreign Application Priority Data

Dec. 20, 2019 (SE) .................................... 1951530-3

(51) Int. Cl.
*C11C 3/12* (2006.01)
*A23D 7/02* (2006.01)
*C11C 1/04* (2006.01)

(52) U.S. Cl.
CPC .................. *C11C 3/12* (2013.01); *A23D 7/02* (2013.01); *C11C 1/04* (2013.01)

(58) Field of Classification Search
CPC ................ C11C 3/12; C11C 1/04; A23D 7/02
See application file for complete search history.

(56) References Cited

U.S. PATENT DOCUMENTS

| | | | |
|---|---|---|---|
| 2,304,842 | A | 12/1942 | McKee et al. |
| 7,951,967 | B2 | 5/2011 | Chun et al. |
| 2011/0008499 | A1 | 1/2011 | Akahane et al. |
| 2016/0088594 | A1 | 3/2016 | Xiong et al. |

FOREIGN PATENT DOCUMENTS

| | | | | |
|---|---|---|---|---|
| EP | 0 151 450 A2 | 5/1985 | | |
| EP | 1 040 761 A1 | 10/2000 | | |
| EP | 2 554 185 A1 | 2/2013 | | |
| EP | 3 245 876 A1 | 11/2017 | | |
| GB | 573815 | 12/1945 | | |
| GB | 711568 | 7/1954 | | |
| RU | 2 307 517 C2 | 10/2007 | | |
| WO | WO 2005/074722 A1 | 4/2005 | | |
| WO | WO 2008/030173 A1 | 3/2008 | | |
| WO | WO 2015/132206 A1 | 9/2015 | | |
| WO | WO 2017/175633 A1 | 12/2017 | | |
| WO | WO 2018/149880 A1 | 8/2018 | | |
| WO | WO 2018/149884 A1 | 8/2018 | | |
| WO | WO-2018206467 A1 * | 11/2018 | ............. | A21D 13/80 |
| WO | WO 2019/166598 A1 | 9/2019 | | |
| WO | WO 2019/185444 A1 | 10/2019 | | |

OTHER PUBLICATIONS

Díaz et al., “Hydrolysis—Hydrogenation of soybean oil and tallow,” 3(7):530-534 (2011).
Moreira et al., “Production and characterization of structured lipids with antiobesity potential and as a source of essential fatty acids,” Food Research International, 99:713-719 (2017).
International Search Report for International Application No. PCT/SE2020/051233, dated Feb. 2, 2021.
Written Opinion of the International Search Authority for International Application No. PCT/SE2020/0511233.

* cited by examiner

*Primary Examiner* — Erik Kashnikow
*Assistant Examiner* — Assaf Zilbering
(74) *Attorney, Agent, or Firm* — Finnegan, Henderson, Farabow, Garrett & Dunner LLP

(57) ABSTRACT

Disclosed is a process of production of a composition comprising triglycerides, wherein the process comprises a step of esterification and to a fat composition produced by the process. The invention further relates to a structuring fat comprising the fat composition obtained by the process disclosed herein.

28 Claims, 1 Drawing Sheet

PROCESS OF PRODUCTION OF A FAT COMPOSITION COMPRISING A STEP OF ESTERIFICATION

This application is a national stage filing under 35 U.S.C. § 371 of International Application No. PCT/SE2020/051233, filed on Dec. 18, 2020, which claims the benefit of the filing date of Swedish Patent Application No. 1951530-3, filed on Dec. 20, 2019, each of which is incorporated herein by reference in its entirety.

TECHNICAL FIELD OF THE INVENTION

The present invention relates to a process of production of a fat composition comprising triglycerides, wherein the process comprises a step of esterification and to a fat composition produced by the process. The invention further relates to a structuring fat comprising the fat composition obtained by the process disclosed herein.

BACKGROUND OF THE INVENTION

There is an increasing focus on avoiding the use of partially hydrogenated vegetable oils. The World Health Organization argues that the removal of partially hydrogenated vegetable oils from the food supply would result in substantial health benefits.

After determining in June 2015 that partially hydrogenated oils (PHOs) were no longer 'generally recognized as safe' for use in human food, the United States Food and Drug Administration requested food manufacturers to remove them from products by June 2018.

Because of this, the consumers wish to avoid hydrogenated food products and thus there is a desire in the food industry towards not having to label the food products are being hydrogenated.

U.S. Pat. No. 7,951,967 describes an esterification reaction without the use of a catalyst, but the reaction disclosed therein needs high temperature between 200-320° C., and a high pressure of atmospheric up to 10 bar pressure to work efficiently. Such a setup requires specialised equipment, a lot of energy, and the high temperature can be harmful to the oil producing polymers and other unwanted reactions, increasing peroxide levels, increasing colour of the oil etc.

Accordingly, the main object of the invention is to provide a simple way of producing a fat composition—preferably a fat product which does not have to be labelled as hydrogenated, which can subsequently be interesterified with a range of vegetable oils to produce a fat product similar to existing fat products on the marked.

SUMMARY OF THE INVENTION

The present invention relates to a process for production of a fat composition comprising triglycerides, wherein the composition contains:

a) at least 8 wt % SatSatSat triglycerides (saturated fatty acids C8-C22), and b) at least 10 wt % stearic acid (C18:0), wherein in said process at least a part of the fatty acids making up the triglycerides present in said composition has been subjected to a hydrogenation step and wherein said process comprises a step of esterification.

By the present process it is possible to obtain a fat composition comprising triglycerides, wherein the composition contains at least 8 wt % SatSatSat triglycerides (saturated fatty acids C8-C22), and at least 10 wt % stearic acid (C18:0), without using shea stearin, mango oil or sal oil as a starting material. These sources are limited in supply and thus expensive materials to use in production. The obtained fat composition can then be used in an interesterification reaction with other oils to replace shea oil and/or shea stearin in interesterification reactions where shea oil and/or shea stearin would otherwise be a component.

The present invention also relates to a structuring fat composition comprising the fat composition obtained by the process according to the present invention.

The present invention also comprises a fat composition comprising at least 10 wt % stearic acid and 8 wt % of SatSatSat and which do not have to be labelled as hydrogenated. As mentioned, there is an increasing focus among the consumers on avoiding hydrogenated food products.

Hence, there is a need for fat compositions which do not have to be labelled as hydrogenated oils and fats in the industry.

The fat composition is in one embodiment a product that resembles an interesterified shea oil composition or an interesterified shea stearin composition. The fat composition is in one embodiment a product that have many features in common with an interesterified shea oil composition or an interesterified shea stearin composition, e.g. such as similar stearic acid (St) and oleic acid (O) content. By resembling is in one embodiment meant that the fat composition of the present invention has a melting curve (Solid Fat Content) comparable to that of interesterified shea oil or shea stearin measured using IUPAC 2.150.

The present invention also relates to a structuring fat composition comprising a fat composition containing at least 10 wt % stearic acid and 8 wt % of SatSatSat and which do not have to be labelled as hydrogenated and further comprising an oil containing 20 to 90% by weight of oleic acid.

DEFINITIONS

Figure 1:
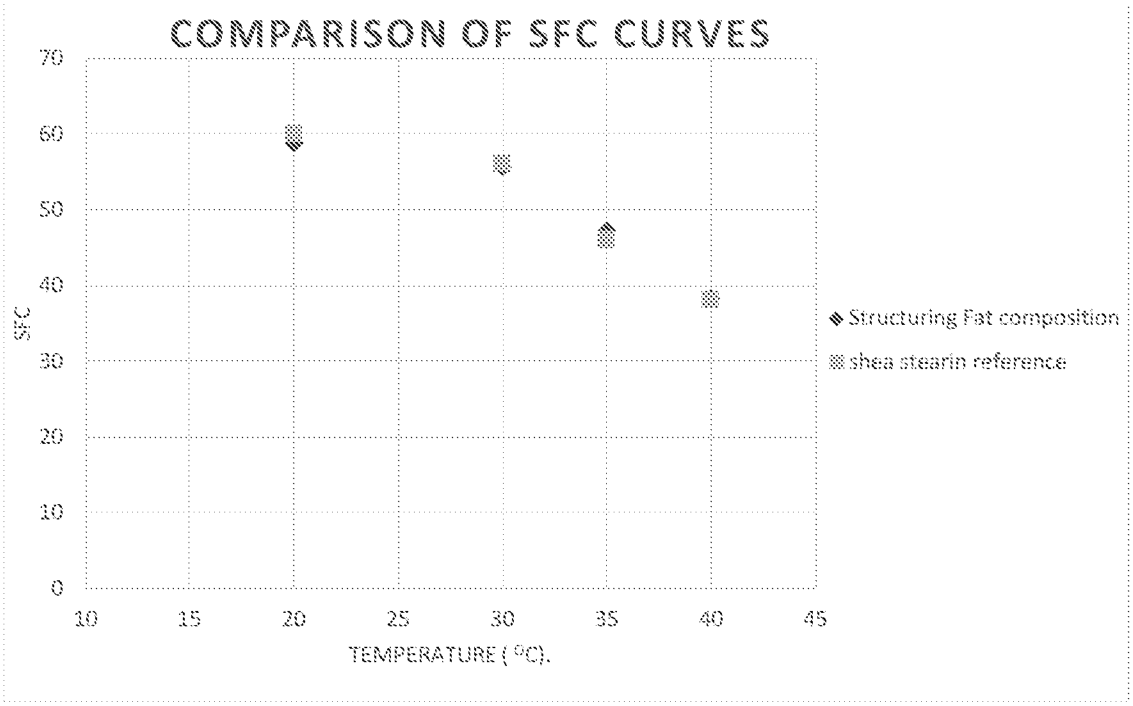
FIG. 1 shows the melting profile of the fat composition as produced in example 2 and of a reference interesterified shea stearin.

As used herein, the term "vegetable" shall be understood as originating from a plant or a single cell organism. Thus, vegetable fat or vegetable triglycerides are still to be understood as vegetable fat or vegetable triglycerides if all the fatty acids used to obtain said triglyceride or fat is of plant or single cell organism origin.

Saturated fatty acids are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. An unsaturated fatty acid can exist in two forms, the cis form and the trans form. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond.

By using the nomenclature CX means that the fatty acid comprises X carbon atoms, e.g. a C14 fatty acid has 14 carbon atoms while a C8 fatty acid has 8 carbon atoms.

By using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

C18:0 is stearic acid (St), C18:1 is oleic acid (0), C18:2 is linoleic acid (Li).

As used herein, "%" or "percentage" relates to weight percentage i.e. wt % or wt.-% if nothing else is indicated.

As used herein, "oil" and "fat" are used interchangeably, unless otherwise specified.

As used herein, "vegetable oil" and "vegetable fat" are used interchangeably, unless otherwise specified.

As used herein the term "single cell oil" shall mean oil from oleaginous microorganisms, which are species of yeasts, molds (fungal), bacteria and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella alpineea, Yarrowia lipolytica, Schizochytrium, Nannochloropsis, Chlorella, Crypthecodinium cohnii, Shewanella.*

As used herein, the term "3-MCPD" is intended to mean 3-MCPD (3-chloropropane-1,2-diol), 2-MCPD (2-chloropropane-1,3-diol) and esters thereof.

For products and methods in the confectionery areas, reference is made to "Chocolate, Cocoa and Confectionery", B. W. Minifie, Aspen Publishers Inc., 3. Edition 1999.

A food product is a product for human consumption. An important group of products is those where cocoa butter and cocoa butter-like fats are used.

By a chocolate or chocolate-like product is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like product may be produced with a low amount of or even without cocoa butter, e.g. by replacing the cocoa butter with a cocoa butter equivalent, cocoa butter substitute, cocoa butter replacer etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

As used herein "residue reactants" is to be interpreted as any free fatty acids, monoglycerides, glycerol and water that have not reacted in a given reaction and hence are left in the reaction mixture as unwanted residue reactants together with the final product.

As used herein "palm plants" is intended to mean the oil palm plants belonging to the genus of *Elaeis*, and more specifically the species *Elaeis guineensis* and *Elaeis Oleifera* and hybrids thereof.

The term "resembles" is to be interpreted as specifying that the fat composition has similar chemical and/or physical characteristics. For example the triglyceride and free fatty acid profile of a fat composition is comparable to the triglyceride and free fatty acid composition of the fat composition referred to, e.g. an interesterified shea oil or an interesterified shea stearin, such as similar stearic acid (St) and oleic acid (O) content. By resembling is in one further embodiment meant that the fat composition of the present invention has a physical behaviour (melting curve) comparable to that of interesterified shea oil or shea stearin measured using IUPAC 2.150.

The term "structuring" in structuring fat composition is intended to mean a composition where at least a part of the fat crystallizes at the given process conditions and thus provides texture in terms of hardness to the product in which it is part of.

The term "comprising", "to comprise" or contains is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

DETAILED DESCRIPTION OF THE INVENTION

When describing the below embodiments, the present invention envisages all possible combinations and permutations of the below described embodiments with the above disclosed aspects.

The invention relates to a process for production of a fat composition comprising triglycerides, wherein the composition contains:

a) at least 8 wt % SatSatSat triglycerides (saturated fatty acids C8-C22), and b) at least 10 wt % stearic acid (C18:0), wherein in said process at least a part of the fatty acids making up the triglycerides present in said composition has been subjected to a hydrogenation step and wherein said process comprises a step of esterification.

By the present process it is possible to obtain a fat composition comprising triglycerides, wherein the composition contains at least 8 wt % SatSatSat triglycerides (saturated fatty acids C8-C22), and at least 10 wt % stearic acid (C18:0), without using shea stearin as a starting material. The obtained fat composition may then be used in an interesterification reaction to replace shea oil and/or shea stearin in interesterification reactions where shea oil and/or shea stearin would otherwise be a component.

The at least 10 wt % stearic acid in b) are part of the at least 8 wt % SatSatSat triglycerides in a). That is; the 10 wt % stearic acid as disclosed in b) is not present as free fatty acids, but that does not exclude that there might also be stearic acid present as free fatty acids as well.

In one or more embodiment the content of SatSatSat triglycerides is at least 10 wt %, such as at least 20 wt %, such as at least 30 wt %, such as at least 40 wt %, such as at least 50 wt %, such as at least 60 wt %.

In one or more embodiment the content of SatSatSat triglycerides is in the range of 10 to 97 wt %, such as in the range of 20 to 97 wt %, such as in the range of 30 to 97 wt %, such as in the range of 40 to 97 wt %, such as in the range of 50 to 97 wt %, such as in the range of 60 to 97 wt %, such as in the range of 70 to 97 wt %.

In one or more embodiment the content of SatSatSat triglycerides is in the range of 10 to 90 wt %, such as in the range of 20 to 90 wt %, such as in the range of 30 to 90 wt %, such as in the range of 40 to 80 wt %, such as in the range of 50 to 80 wt %, such as in the range of 60 to 80 wt %.

In one or more embodiment the content of C16 in the composition is less than 50 wt %, such as less than 40 wt %, such as less than 30 wt %, such as less than 20 wt %, such as less than 10 wt %, such as less than 5 wt %.

In one or more embodiment the content of C16 in the composition is in the range of 50 to 5 wt %, such as in the range of 40 to 5 wt %, such as in the range of 30 to 5 wt %, such as in the range of 20 to 5 wt %, such as in the range of 10 to 5 wt %.

In one or more embodiment the content of C16 in the composition is in the range of 50 to 10 wt %, such as in the range of 40 to 10 wt %, such as in the range of 30 to 10 wt %, such as in the range of 20 to 10 wt %, such as in the range of 15 to 10 wt %.

In one or more embodiment the content of stearic acid (C18:0) is at least 15 wt %, such as at least 20 wt %, such as at least 25 wt % such as at least 30 wt %, such as at least 40 wt %.

In one or more embodiment the content of stearic acid (C18:0) is in the range of 10 to 97 wt %, such as in the range of 20 to 97 wt %, such as in the range of 30 to 97 wt %, such as in the range of 40 to 97 wt %, such as in the range of 50 to 97 wt %, such as in the range of 60 to 97 wt %, such as in the range of 70 to 97 wt %.

In one or more embodiment the content of stearic acid (C18:0) is in the range of 10 to 90 wt %, such as in the range of 20 to 90 wt %, such as in the range of 30 to 90 wt %, such as in the range of 40 to 80 wt %, such as in the range of 50 to 80 wt %, such as in the range of 60 to 80 wt %.

In one or more embodiment the process comprises the following steps:

a) Providing a vegetable fat or oil;
b) Subjecting said vegetable fat or oil to a hydrolysis process obtaining glycerol and free fatty acids;
c) Subjecting at least part of the free fatty acids from said hydrolysis process in step
b) to a hydrogenation process, thereby fully saturating said free fatty acids to form a first free fatty acid mixture;
d) Optionally adding further free fatty acids to said first free fatty acid mixture, to form a second free fatty acid mixture;
e) Re-esterifying said free fatty acid mixture of step c) and/or step d) with glycerol to form said SatSatSat triglycerides; and
f) Performing a distillation process on the resulting SatSatSat triglycerides product of step e) to remove residue reactants, thereby obtaining said fat composition containing at least 10 wt % stearic acid (C18:0) and at least 8 wt % SatSatSat triglycerides.

The steps a) to f) are in one embodiment sequentially in that order, hence step a) before step b) and so forth.

The first free fatty acid mixture can in one embodiment comprise both hydrogenated and non-hydrogenated free fatty acids or in another embodiment comprise only hydrogenated free fatty acids alone.

The further free fatty acids that may be added to the first free fatty acid mixture can be both hydrogenated and/or non-hydrogenated.

The fat composition obtained by the present process comprises no more than 1% trans fatty acids, such as no more than 0.5% trans fatty acids, such as no more than 0.2% trans fatty acids, In one or more embodiment of the process the fatty acid composition of said vegetable fat or oil provided in step a) comprises 65 wt %, such as 75 wt %, such as 85 wt %, such as more than 90 wt % of C18. In one embodiment of the process the fatty acid composition of said vegetable fat or oil provided in step a) comprises from 65 wt % to 98 wt % C18. C18 covers C18:0, C18:1, C18:2, C18:3, C18:4 or any mixtures thereof, and the C18 is primarily present as TAGs in the vegetable fat or oil.

In one or more embodiments of the process the vegetable fat or oil can originate from, but is not limited to shea oil, sunflower oil, soybean oil, palm oil, corn oil, rapeseed oil and/or their high-oleic equivalents, coconut oil, palm kernel oil and mixtures thereof.

In one or more embodiments, the vegetable fat or oil is not palm oil or palm kernel oil, i.e. not fat or oil originating from palm plants.

In one or more embodiments, the vegetable fat or oil is shea butter i.e. shea oil, such as shea olein obtained by fractionation of shea oil.

In one or more embodiments of the process the free fatty acids originate from a shea source where the origin of the free fatty acids is shea oil or shea olein (not shea stearin).

In one or more embodiments, the fat or oil is not originating from a single cell organism.

The free fatty acids that results from step c) of the process may comprise between 85% and 100% by weight of C18:0, such as between 90% and 100% by weight of C18:0, such as between 95% and 100% by weight of C18:0, such as between 98% and 100% by weight of C18:0. In one or more embodiments the free fatty acids used in the present method in step d) are essentially consisting of C18:0.

The free fatty acids that results from step c) of the process may comprise between 85% and 99% by weight of C18:0, such as between 90% and 99% by weight of C18:0, such as between 95% and 99% by weight of C18:0, such as between 98% and 99% by weight of C18:0.

In one or more embodiments of the process none of the triglycerides in the fat composition are at anytime in the process subjected to hydrogenation.

In theory a similar, non-hydrogenated, product can be obtained by fractionating vegetable oils and fats, but this will give a low yield and typically 20-50% SatSatSat. It will be a significantly more expensive process as several steps will be added, and fractionation will be required. In the present process, no fractionation of oils is conducted. The purity of the product might also be compromised as it will be very difficult to separate the high-melting triglycerides like SSS, PPP, PSS, PPS using fractionation. This process will therefore be expensive, time-consuming and will require a higher capacity in production.

At no point in the process of the invention is fractional distillation performed on the fatty acids. Particularly, no fractional distillation is performed prior to hydrogenation of the fatty acids.

The present process results in little formation of di- and monoglycerides, and contaminants like 3-MCPD and colouring components. Using the standard method such contaminants are usually present in the final fat composition produced and especially the formation of very little 3-MCPD in the present process is very beneficial. The formation of 3-MCPD in the fat composition of the invention is less than 2 ppm 3-MCPD or such as less than 1 ppm 3-MCPD.

In one or more embodiments the re-esterification in step e) mentioned above comprises the steps of:

i. blending the glycerol and free fatty acid mixture in a container obtaining a glycerol and free fatty acid mixture blend;
ii. heating said blend under reduced pressure over a predefined period of time;

iii. further increasing the temperature and heating said blend over a predefined period of time and simultaneously lowering the pressure further compared to step ii)

iv. keeping said blend at the temperature and pressure of step iii) for a predefined period of time.

In one or more embodiments, the re-esterification process in step e) is done without application of a catalyst.

Step e) in the present process is a re-esterification process. A standard re-esterification process uses a catalyst, and thus one of the advantages of the present process is that it can be done without catalyst in reasonable time and with reasonable yield. Since the process does not need a catalyst there is no need for extra processing steps to remove the catalyst after the reaction which makes the overall process simple and easy to handle.

In one or more embodiments of the process the glycerol and the free fatty acid mixture of step i) is mixed at a ratio of 1:3.125 or up to 1:10 (mol glycerol:mol free fatty acid) to obtain the glycerol and free fatty acid mixture blend. In one or more embodiments, the ratio is from 1:3.125 up to 1:6, e.g. from 1:3.125 up to 1:4.

Since a glycerol molecule contains 3 alcohol groups, a 1:3 glycerol:FFA by mole means that there is an exact match between the number of alcohol groups on the glycerol and number of free fatty acids present in the solution. The ratio of glycerol to free fatty acids (glycerol:FFA) of 1:10 means there is 233% excess of free fatty acids relative to the alcohol groups on the glycerol molecule. The ratio of glycerol to free fatty acids (glycerol:FFA) of 1:4 means that there are 33% excess of free fatty acids, whereas the 1:3.125 means that there are 4.2% excess of free fatty acids relative to the alcohol groups on the glycerol molecule.

A container may be any container suitable for carrying out a chemical reaction. Such containers may e.g. be, but not limited to, a flask, a tank, a tube, an Erlenmeyer flask, a laboratory flask, a round-bottom flask, a three-necked flask, a two-necked flask, a one-necked flask, a glass flask, or a metal flask. The reaction may be carried out with or without agitation.

In one or more embodiments of the process a condenser is used. The condenser is heated to a temperature of 40 to 150° C., such as 50 to 90° C. such as 65 to 90° C. This temperature of the condenser is dependent on the size and surface area of the condenser and it is important to use a temperature where water is evaporated while the majority of the glycerol is condensed, to avoid losing too much of the glycerol. A person skilled in the art would know how to adjust this.

In one or more embodiment of the process the glycerol and free fatty acid mixture is heated to a temperature in the range of 140 to 180° C. in step ii). In one or more embodiment of the process, the glycerol and fatty acid mixture is heated to a temperature in the range of 160 to 170° C. in step ii).

In one or more embodiment of the process the reduced pressure in step ii) is in the range of 150 to 400 mbar, such as in the range of 175 to 250 mbar.

In one or more embodiment of the process the predefined period of time in step ii) is in the range of 15 minutes to 5 hours, such as in the range of 30 minutes to 4 hours.

In one example, the step of heating the reaction to between 140° C. and 180° C. in step ii) will take approx. 15-35 min on small scale (1.5 kg), and approx. 2-3 hours on large (400 kg) scale.

In one or more embodiment of the process the predefined period of time in step ii) is at least 15 minutes, such as at least 20 minutes, such as at least 30 minutes, such as at least 1 hour, such as at least 2 hours, such as at least 3 hours.

In one or more embodiment of the method the temperature in step iii) is in the range of 180 to 250° C., such as in the range of 210 to 230° C.

In one or more embodiments, the blend in step iii) is heated to at least 160° C.

In one or more embodiments, the blend in step iii) is heated to maximum 230° C. In one or more embodiments, the blend in step iii) is heated to maximum 240° C.

The temperature is gradually raised when going from step ii) to step iii). In one or more embodiments the temperature is raised from around 170° C. in step ii) and up to around 210° C. in step iii).

In one or more embodiment of the process the pressure in step iii) is in the range of 10 to 400 mbar, such as in the range of 20 to 250 mbar, such as in the range of 30 to 150 mbar, such as in the range of 30 to 90 mbar, such as in the range of 30 to 40 mbar.

The pressure is gradually decreased when going from step ii) to step iii). In one or more embodiments the pressure is decreased from around 200 mbar in step ii) and down to around 30 mbar in step iii).

In one or more embodiment of the process the predefined period of time in step iii) is in the range of 15 minutes to 5 hours, such as in the range of 30 minutes to 4 hours.

In one or more embodiment of the process the predefined period of time in step iii) is at least 15 minutes, such as at least 20 minutes, such as at least 30 minutes, such as at least 1 hour, such as at least 2 hours.

In one example, the step of heating the reaction from between 140° C. and 180° C. up to between 180 and 210° C. will take approx. 15-35 min on small scale (1.5 kg), and approx. 2-3 hours on large (400 kg) scale.

In one or more embodiments, the full process is completed in less than 24 hours, such as less than 20 hours, such as less than 15 hours, such as less than 10 hours. Preferably the full process is completed within from 5 to 20 hours.

The skilled person will know that the appropriate reaction depends on both the chosen reaction temperature and excess of free fatty acids used. If the reaction temperature is increased the reaction time will be shorter, and likewise if a lower reaction temperature is chosen the reaction time will be longer. If a larger excess of free fatty acids is used the reaction time will be shorter, and likewise, if a smaller excess of free fatty acids is used the reaction time will be longer. If both a high temperature and a high excess of free fatty acids are used, the reaction time will also be shorter.

In one or more embodiments of the present method, a catalyst is added in step i). The addition of a catalyst may increase reaction speed and hence reduce the overall reaction time needed to obtain the vegetable fat composition. The catalyst can be any catalyst known to be beneficial in an esterification process and particularly preferred is the use of zinc oxide as a catalyst. Hence, in one or more embodiments of the present method, zinc oxide (ZnO) is added in step i) as a catalyst.

As it is known to the person skilled in the art, that the predefined amount of time in step iv) needed for obtaining a fat composition will decrease if a catalyst is used.

In one or more embodiments of the present process, zinc oxide (ZnO) is added in step i) as a catalyst and the predefined amount of time of step iv) is at least 1 hour, such as at least 2 hours, such as at least 3 hours, such as at least 4 hours, such as at least 5 hours. Thus, in one embodiment the predetermined amount of time is from 1 to 10 hours.

It is well within the skills of the skilled person to determine the amount of catalyst needed in the process. In one or more embodiments of the present method, that amount of catalyst added is at least 0.8%, such as at least 0.9%, such as 1%. The skilled person will also know that a higher amount of catalyst can be added, which will lead to a faster reaction time, however there is a natural upper limit of how much catalyst there should be added. In one or more embodiments of the present process, no more than 2% catalyst is added, such as no more that 1%, such as no more than 0.5%.

In one or more embodiment of the process, the distillation in step f) (physical refining) takes place at a temperature of at least 160° C., and under reduced pressure. In one or more embodiment of the process, the distillation takes place at a temperature of at least 190° C., and under reduced pressure. In one or more embodiment of the process the distillation takes place at a temperature of between 220 and 260° C., and under reduced pressure, such as around 230° C., and under reduced pressure. This is standard conditions for a distillation process as known by the person skilled in the art. In one embodiment, chemical refinement can be used instead of physical refining and the skilled person will then know to change the temperature to around 100° C. In one embodiment, chemical refinement could be conducted by mixing lye, water and the fat composition at 100° C. after which the fat composition is washed with water to remove residue reactants.

In one or more embodiment, the excess free fatty acids removed after physical or chemical refinement can be recycled and reused in a new batch of the present process, which will lower the cost of the overall process and minimize side stream waste.

The hydrolysis in step b) may take place at high pressure and high temperature in a counter-current reaction tower. The fats and/or oils are fed near the bottom of the tower, and the water is fed near the top of the tower. Due to difference in density, the water will be transported downwards through the tower and the oil/fat will strive upwards. During the contact of water phase and fat phase hydrolysis will take place and fatty acid and glycerol will be formed. Glycerol is leaving the tower, together with surplus water, at the bottom and the fatty acid is leaving the tower at the top. The glycerol may be used in the esterification reaction once water has been removed. After the hydrolysis step the hydrolysed fatty acids can be purified by a vacuum distillation.

In the hydrogenation step c), at least a part of the free fatty acids are fully hydrogenated to remove any double bonds, thereby fully saturating said free fatty acids to form a first free fatty acid mixture. Hydrogen gas is fed to the reactor in the presence of a catalyst. The double bonds are hydrogenated, and the catalyst is removed by bleaching and filtration after the reaction. The catalyst can be any standard catalyst known in the art. As an example can be mentioned PRICAT 9953.

Instead of hydrogenation, the free fatty acids can optionally be obtained by distillation (purification), and/or fractionation to achieve another free fatty acid composition.

In one or more embodiment, in the hydrogenation step c), the purified free fatty acids are hydrogenated to remove any double bonds, thereby converting close to all C:18 free fatty acids into stearic acid (C18:0).

An advantage of the present process is that the product obtained does not need to be labelled as hydrogenated. The present esterification process as disclosed herein produces a fat composition, which can function as a source of non-hydrogenated fat rich in SatSatSat. It is important that the vegetable oil or fat is first hydrolysed, and then hydrogenated—since then it is assured that it is the free fatty acids that has been hydrogenated, not the original oil. That is, at no point in the process, are the triglycerides subjected to hydrogenation. This produces a "consumer friendly" product as hydrogenation is typically undesired by consumers and requires additional labelling of the product.

The present disclosure also comprise a structuring fat composition comprising the fat composition obtained by the process as disclosed herein.

In one or more embodiments, the structuring fat composition is further subjected to an interesterification process. In one or more embodiments, said interesterification is chemical interesterification. In one or more embodiments, said interesterification is enzymatic interesterification.

In one or more embodiments, the structuring fat composition further comprises one or more of the vegetable fats or oils selected from the group consisting of shea oil, sal oil, sunflower oil, soybean oil, palm oil, corn oil, rapeseed oil and/or their high-oleic equivalents, coconut oil, palm kernel oil and mixtures thereof.

In one or more embodiments, said structuring fat composition comprises coconut oil. In one or more embodiments, said structuring fat composition does not contain palm oil or palm kernel oil.

Disclosed herein is also a fat composition comprising at least 10 wt % stearic acid and 8 wt % of SatSatSat and which does not need to be labelled as hydrogenated and manufactured by the process according to the present invention and as disclosed herein.

The present disclosure also comprise a fat composition comprising at least 10 wt % stearic acid and 8 wt % of SatSatSat and which does not need to be labelled as hydrogenated.

When a fat composition of the invention does not need to be labelled as hydrogenated, it is intended to mean that the triglycerides in said fat composition is not at any timepoint subjected to hydrogenation and is as such non-hydrogenated.

In one or more embodiments the fat composition further comprises 6% by weight or less of diglycerides, and 4% by weight or less of monoglycerides, and 3% by weight or less of free fatty acids.

In one or more embodiments the fat composition comprises from 0.5% by weight to 6% by weight of diglycerides, and from 0.1% by weight to 4% by weight of monoglycerides, and from 0.1% by weight to 3% by weight of free fatty acids.

In one or more embodiments, the fat composition resulting from the method of the present invention is a vegetable fat composition. In one or more embodiments, when the fatty acid composition of the vegetable fat or oil provided in step a) comprises 65 wt %, such as 75 wt %, such as 85 wt %, such as more than 90 wt % of C18. In one embodiment, the vegetable fat or oil provided in step a) comprises from 65 wt % to 98 wt % of C18.

In one or more embodiments, the fat composition comprises at least 27% by weight of tristearin, such as at least 65% by weight of tristearin, such as at least 70% by weight of tristearin, such as at least 75% by weight of tristearin, such as at least 80% by weight of tristearin, such as at least 83% by weight of tristearin, such as at least 85% by weight of tristearin, such as at least 88% by weight of tristearin such as at least 90% by weight of tristearin, such as at least 92% by weight of tristearin, such as at least 94% by weight of tristearin, or such as at least 95% by weight of tristearin.

In one or more embodiments the fat composition comprises from 61 to 97% by weight of tristearin, such as from 65 to 97% by weight of tristearin, such as from 70 to 97% by weight of tristearin, or such as from 75 to 97% by weight of tristearin.

In one or more embodiments the fat composition comprises from 61 to 97% by weight of tristearin and from 85 to 99% by weight of C18:0.

Tristearin, also known as propane-1,2,3-triyltrioctadecanoate and Glyceryl tristearate, is composed of three stearic acid molecules (C18:0) attached to the three alcohol groups on a glycerol molecule via three separate esterification reactions.

Tristearin can be made by fully hydrogenating an oil with a high content of C18, like rapeseed oil, but such a product must be labelled as hydrogenated, which is very undesirable. This procedure is without using an esterification procedure.

In one or more embodiments, the fat composition resembles an interesterified shea oil or an interesterified shea stearin.

Also disclosed is a structuring fat composition comprising the fat composition as disclosed herein and further comprising an oil containing 20 to 90% by weight of oleic acid.

Hence the present disclosure also relates to a structuring fat composition comprising a fat composition comprising at least 10 wt % stearic acid and 8 wt % of SatSatSat and which do not have to be labelled as hydrogenated and further comprising an oil comprising 20 to 90% by weight of oleic acid.

In one or more embodiments, the oil comprising 20 to 90% by weight of oleic acid is selected from the group consisting of shea oil, sal oil, sunflower oil, soybean oil, palm oil, corn oil, rapeseed oil and/or their high-oleic equivalent, coconut oil, palm kernel oil and mixtures thereof.

In one or more embodiments, the structuring fat composition is manufactured in a process comprising the steps of:

a) mixing 10 to 80% by weight of the fat composition as obtained by the process according to the present disclosure with
b) 20 to 90% by weight of an oil containing 20 to 90% by weight of oleic acid to obtain a mixture;
c) interesterifying the mixture from step b) to obtain a structuring fat composition.

The ratio of fat composition and the oleic-containing oil depends on which oleic-containing oil is used, and further which type of product is wanted.

In one or more embodiments, the ratio used is 20 to 65% by weight of the fat composition to 35 to 80% by weight of an oil containing 20 to 90% by weight of oleic acid. In one or more embodiments, the ratio used is 20 to 60% by weight of the fat composition to 40 to 80% by weight of an oil containing 20 to 90% by weight of oleic acid. In one or more embodiments, the ratio used is 20 to 58% by weight of the fat composition to 42 to 80% by weight of an oil containing 20 to 90% by weight of oleic acid. In one or more embodiments, the ratio used is 40 to 65% by weight of the fat composition to 35 to 60% by weight of an oil containing 20 to 90% by weight of oleic acid.

In one or more embodiments, the process further comprises adding one or more further vegetable oils to the mixture from step b).

In one or more embodiments the one or more further vegetable oils can originate from one or more of of shea oil, sal oil, sunflower oil, soybean oil, palm oil, corn oil, rapeseed oil and/or their high-oleic equivalent, coconut oil, palm kernel oil and mixtures thereof.

The fat composition and the structuring fat composition can be used in plant-based food products, bakery, dairy, or confectionary applications. Plant-based food products are food products based mainly or solely on vegetable components. The skilled person will know that the fat composition and the structuring fat composition of the present disclosure can be used in any application where shea stearin or shea oil would otherwise be used.

In one or more embodiments, the use of the fat composition and the structuring fat composition is for the manufacture of a processed food product; or as a fat component, which are to be incorporated in a food product.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisage all possible combinations and permutations of the described embodiments.

The present invention is further illustrated by the following examples, which are not to be construed as limiting the scope of protection.

EXAMPLES

Example 1—Esterification of Glycerol with Free Fatty Acids

Glycerol and free fatty acids were mixed in a reaction vessel in the ratio as disclosed in the below table 1, where the free fatty acids in this example is comprising 98.5% by weight of C18:0, 0.5% by weight of C16:0 and 0.9% by weight of C20:0 (analyzed using IUPAC 2.304). The reaction vessel is equipped with a vacuum inlet, a cold trap, and a condenser heated to 70° C. The reaction mixture was heated to 150° C. over app. 20 min under vacuum (200 mbar). The temperature was gradually raised to 210-230° C. while the pressure was gradually lowered to 33 mbar over a 30-60 min period. Once the final reaction temperature was reached, the reaction mixture was left at these conditions for between 5 hours and 30 minutes and 10 hours and 30 minutes (see table 1). The crude oil obtained was then distilled at 240° C. under reduced pressure to remove excess free fatty acids to yield the final product as shown in table 1.

TABLE 1

| Product | max temp. | wt % stearic acid of FA | FA:Gly (mol:mol) | Time (hours) | wt % TAG | wt % DAG | wt % MAG | wt % FFA | wt % SSS (in TAG product) |
|---|---|---|---|---|---|---|---|---|---|
| 1 | 210° C. | 98.5 | 4:1 | 5.5 | 95.4 | 3.5 | 0.5 | 0.5 | 95.6 |
| 2 | 220° | 98.5 | 4:1 | 5.5 | 96.3 | 2.3 | 0.9 | 0.5 | 95.6 |

TABLE 1-continued

| Product | max temp. | wt % stearic acid of FA | FA:Gly (mol:mol) | Time (hours) | wt % TAG | wt % DAG | wt % MAG | wt % FFA | wt % SSS (in TAG product) |
|---|---|---|---|---|---|---|---|---|---|
| | C. | | | | | | | | |
| 3 | 230° C. | 98.5 | 4:1 | 5.5 | 97.8 | 1 | 0.7 | 0.5 | 95.6 |
| 4 | 210° C. | 98.5 | 3.5:1 | 10.5 | 94 | 2.8 | 0 | 2.5 | 95.6 |
| 5 | 230° C. | 98.5 | 3.5:1 | 10.5 | 95.9 | 0.7 | 0 | 2.6 | 95.6 |

The composition product is analyzed using AOCS Cd 22-91. The fatty acid composition of TAG product is analyzed using IUPAC 2.304 (GLC). The TAG composition of the TAG product is calculated using the proviso of 100% random chemical inter-esterification.

The final products produced in this example all have low amounts of 3-MCPD, that is less than 1 ppm of 3-MCPD or esters thereof.

As shown in the above table a very pure SSS TAG product may be obtained using the present process.

The experiments showed that the higher the temperature, the faster the reaction. However, the stearic acid will start to oxidize/decompose excessively if the reaction is heated to 260° C. for too long. If the reaction is left at 150° C., it will be slow, but a low amount of tristearin will eventually form. If a low excess of stearic acid is used at 150° C. the reaction will be very slow. Further, shorter reaction time and lower temperature will lead to a higher content of DAG and MAG.

The experiments also showed that the lower the pressure the easier it is to evaporate water, which is essential for the reaction to work since removing the formed water is the driving force of the reaction. However, if the pressure is too low, glycerol will also start to evaporate, resulting in a lower yield of tristearin. Therefore, a very low pressure of e.g. 10 mbar and a high temp of 210° C. for too long would result in formation of tristearin, but also in lower yield because some glycerol would be evaporated and lost. If the reaction is left at 400 mbar it will be slower than if a lower pressure is applied as water will be evaporated more slowly.

Further, the bigger the excess of stearic acid, the faster the reaction will be.

The temperature of the condenser must be hot enough for water to evaporate, but cold enough so that glycerol will condense and run back into the reaction. The experiments showed that heating the condenser to a temperature between 40 to 150° C. will work for this set-up as disclosed in the examples. The temperature is dependent on the size of the condenser and the important thing is to use a temperature where water is evaporated without also evaporating the glycerol. The skilled person would know how to adjust this according to equipment and a temperature in the range of 50 to 90° C. is standard in the field.

The excess stearic acid can be recycled after distillation, refined and reused in a new esterification reaction, which will lower the cost of the overall process and minimize side stream waste.

The obtained tristearin fat composition can further be used in the below process (example 2) to make a structuring fat composition that can replace shea oil/shea stearin which is a limited and very expensive component.

Example 2—Interesterification Reaction Using Tristearin to Make a Structuring Fat Composition The tristearin fat composition obtained from the above process can be mixed with an oleic-containing oil (e.g. shea olein or high oleic sunflower oil (HOSO)) and be used as a component to replace shea oil/shea stearin in interesterification reactions where shea oil/shea stearin would otherwise be a component.

Experimental:

In the present example, the tristearin fat composition used is made using the conditions shown in the first row (1) in table 1 (4:1, 5.5 h, 210° C.) and is mixed with shea olein in a ratio of 45% by weight of tristearin fat composition to 55% by weight of shea olein. The mixture was then chemically interesterified using standard conditions to make the structuring fat composition.

Below in table 2 the results from different analyses are shown where the structuring fat composition is compared with a regular reference shea stearin. Table 2 shows the FFA composition of the structuring fat composition compared to a regular reference shea stearin. As evident the FFA composition of the two oils are similar. (measured using IUPAC 2.304).

TABLE 2

| FFA composition | structuring fat composition | Reference shea stearin |
|---|---|---|
| C16:0 | 2 | 3 |
| C18:0 | 62 | 59 |
| C18:1 | 30 | 33 |
| C18:2 | 5 | 3 |

Also, the physical behaviour of the two oils have been compared (table 3 and FIG. 1). This shows that the oils are not only similar in composition but also in their physical behaviour in relation to melting profile (measured using IUPAC 2.150).

TABLE 3

| Solid fat content (SFC NMR) (° C.) | structuring fat composition | Reference shea stearin |
|---|---|---|
| 20 | 59 | 60 |
| 30 | 56 | 56 |
| 35 | 47 | 46 |
| 40 | 38 | 38 |

As shea stearin is a natural product the fatty acid composition will vary from batch to batch. The reference interesterified shea stearin shown in the example is just one interesterified shea stearin, and it must therefore be expected that the fatty acid and triglyceride composition can be different from other interesterified shea stearins within the naturally expected variance.

To conclude, the process as disclosed herein can be used to make a structuring fat composition that is similar in both composition and physical behaviour to interesterified shea stearin.

One of the advantages of the process is that since no shea oil/shea stearin is added to the composition the structuring fat composition can be cheaper than interesterified shea oil and interesterified shea stearin. The low availability of shea oil/shea stearin component is no longer a problem with the present process since the use of shea oil/shea stearin component can be avoided.

Example 3—Interesterification Reaction with Tristearin and Two Additional Oils to Make a Structuring Fat Composition The tristearin fat composition obtained from the process disclosed in example 1 can be mixed with an oleic-containing oil (e.g. shea olein or high oleic sunflower oil (HOSO) along the lines of what is described in example 2) and further mixed with another or several other oils and be used as a component to replace shea oil/shea stearin in interesterification reactions where shea oil/shea stearin would otherwise be a component to generate products with different properties depending on the additional oil(s) used.

Experimental:

In the present example, the tristearin fat composition used is made using the conditions shown in the first row (1) in table 1 (4:1, 5.5 h, 210° C.) and is mixed with shea olein and coconut oil in a mix of 32% by weight of tristearin fat composition to 39% by weight of shea olein to 29% by weight of coconut oil. The mixture was then interesterified using standard conditions.

Table 4 shows the FFA composition of the structuring fat composition (measured using IUPAC 2.304).

TABLE 4

| FFA composition | Structuring fat composition |
|---|---|
| C12:0 | 13.6 |
| C14:0 | 5.4 |
| C16:0 | 4.2 |
| C18:0 | 44.7 |
| C18:1 | 23.2 |
| C18:2 | 3.7 |

Figure 2:
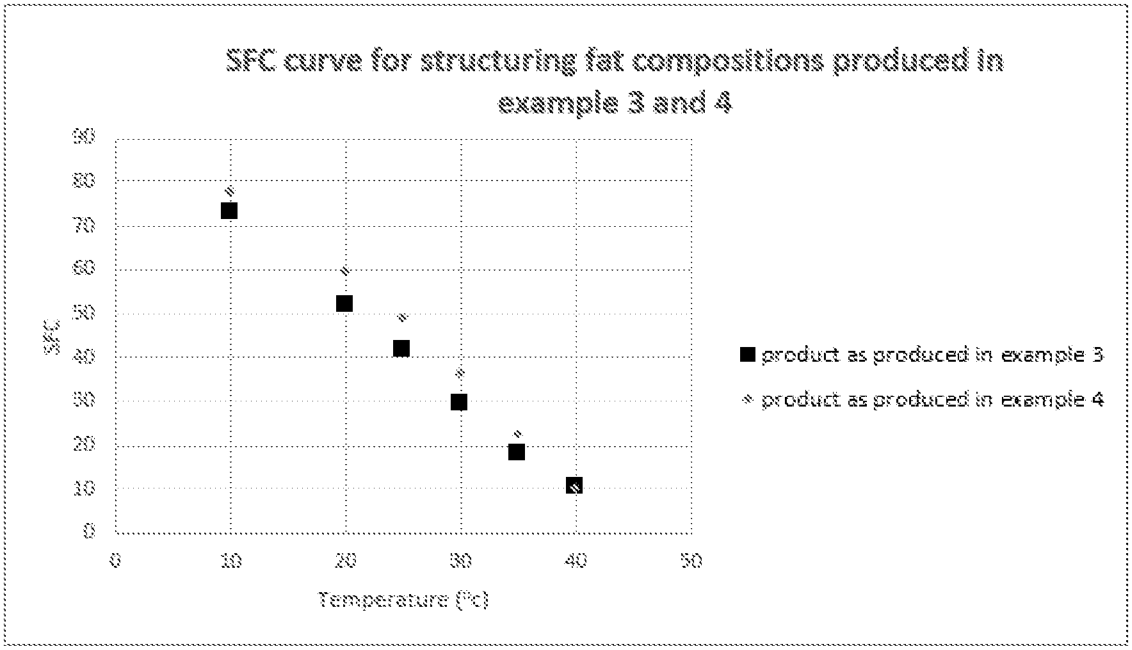
FIG. 2 shows the melting profile of the products as produced in example 3 and example 4.

Lastly, the physical behaviour of the product is shown (FIG. 2). This SFC graph shows that this product among other things is well suited as a structuring fat composition for different applications e.g. in bakery products (measured using IUPAC 2.150).

To conclude the process as disclosed herein can be used to make a product comprising several oils.

One of the advantages are that since no shea oil/shea stearin is added to the composition the product can be cheaper. The low availability of shea oil/shea stearin component is no longer a problem with the present method since the use of shea oil/shea stearin component can be avoided.

Example 4—Making a Structuring Fat Composition Directly with an Esterification Reaction In the previous example 2 and 3, the desired fat composition has been made by mixing the produced tristearin with shea olein and/or other oils after which the mixture has been interesterified using standard conditions to achieve the desired fat composition. It is also possible, however, to make the desired structuring fat composition directly from the esterification reaction, thereby circumventing the interesterification process.

In example 3 a structuring fat composition was produced by interesterifying tristearin, shea olein and coconut oil. This product has also been made using only the esterification reaction. In this case glycerol and free fatty acids are mixed in appropriate ratios and re-esterified to yield the desired product directly. This yields a product of high quality with low amounts of diglycerides.

Experimental:

In the present example the structuring fat composition is made by mixing glycerol with an appropriate free fatty acid mixture (43% stearic acid, 32% oleic acid (that contains 12% C18:2) 13% lauric acid, 7% palmitic acid and 5% myristic acid). The mixture was then re-esterified using the same conditions as described for the production of tristearin shown in Example 1, in the first row (1) of table 1 (4:1, 5.5 h, 210° C.). The crude oil was then distilled to remove residue reactants to yield the final product.

TABLE 5

| FFA composition | Product from example 3 (esterification + interesterification) | Product from example 4 (esterification) |
|---|---|---|
| C12:0 | 13.6 | 12.3 |
| C14:0 | 5.4 | 5.2 |
| C16:0 | 4.2 | 8.9 |
| C18:0 | 44.7 | 44.1 |
| C18:1 | 23.2 | 25.1 |
| C18:2 | 3.7 | 3.5 |

When comparing the fatty acid compositions of the two structuring fat compositions made in example 3 and example 4 there is slightly more palmitic acid in the product shown in example 4. This is due to the low content of palmitic acid in the tristearin and the shea olein used for the interesterification reaction with coconut oil in example 3. As these two components have a low content of palmitic acid, the final product from the interesterification reaction will also have a low content of palmitic acid. If it was desirable to decrease the content of palmitic acid in the structuring fat composition obtained in example 4, the ratio of palmitic acid that was added to the reaction mixture could have been adjusted to achieve this result.

There are several advantages to making the desired structuring fat composition directly with the esterification process. In this way it is possible to eliminate the interesterification step, making the overall process more efficient, and using only the esterification process also yield products with low amounts of diglycerides as shown in table 6.

TABLE 6

| | Product from example 3 | Product from example 4 |
|---|---|---|
| Diglyceride content (%) | 5.5 | 3.5 |

Also, the physical behaviour of the structuring fat composition produced in example 3 and the structuring fat composition produced in example 4 have been compared (table 7 and FIG. 2). This shows that the oils are not only similar in composition but also in their physical behaviour in relation to melting profile (measured using IUPAC 2.150).

TABLE 7

| Solid fat content (SFC NMR) (° C.) | structuring fat composition produced in example 3 | structuring fat composition produced in example 4 |
|---|---|---|
| 10 | 73 | 78 |
| 20 | 52 | 60 |
| 25 | 42 | 49 |
| 30 | 30 | 36 |
| 35 | 18 | 23 |
| 40 | 11 | 10 |

The invention is further described in the following non-limiting items.

1. A process for production of a fat composition comprising triglycerides, wherein the composition contains:
   a) at least 8 wt % SatSatSat triglycerides (saturated fatty acids C8-C 22), and
   b) at least 10 wt % stearic acid (C18:0),
   wherein in said process at least a part of the fatty acids making up the triglycerides present in said composition has been subjected to a hydrogenation step and wherein said process comprises a step of esterification.
2. The process according to item 1, wherein the content of SatSatSat triglycerides is at least 10 wt %, such as at least 20 wt %, such as at least 30 wt %, such as at least 40 wt %, such as at least 50 wt %, such as at least 60 wt %.
3. The process according to item 1 or 2, wherein the content of C16 in the composition is less than 50 wt %, such as less than 40 wt %, such as less than 30 wt %, such as less than 20 wt %, such as less than 10 wt %, such as less than 5 wt %.
4. The process according to any of the proceeding items wherein the content of stearic acid (C18:0) is at least 15 wt %, such as at least 20 wt %, such as at least 25 wt % such as at least 30 wt %, such as at least 40 wt %.
5. The process according to any of the proceeding items, wherein said process comprises the following steps:
   a) Providing a vegetable fat or oil;
   b) Subjecting said vegetable fat or oil to a hydrolysis process obtaining glycerol and free fatty acids;
   c) Subjecting at least part of the free fatty acids from said hydrolysis process in step
   b) to a hydrogenation process, thereby fully saturating said free fatty acids to form a first free fatty acid mixture;
   d) Optionally adding further free fatty acids to said first free fatty acid mixture, to form a second free fatty acid mixture;
   e) Re-esterifying said free fatty acid mixture of step c) and/or step d) with glycerol to form said SatSatSat triglycerides; and
   f) Performing a distillation process on the resulting SatSatSat triglycerides product of step e) to remove residue reactants,
   thereby obtaining said fat composition containing at least 10 wt % stearic acid (C18:0) and at least 8 wt % SatSatSat triglycerides.
6. The process according to any of the proceeding items, wherein none of the triglycerides in the fat composition are at anytime in the process subjected to hydrogenation.
7. The process according to any of item 5 or 6, wherein the re-esterification in step e) comprises the steps of:
   i. blending the glycerol and free fatty acid mixture in a container obtaining a glycerol and free fatty acid mixture blend;

ii. heating said blend under reduced pressure over a predefined period of time;
   iii. further increasing the temperature and heating said blend over a predefined period of time and simultaneously lowering the pressure further compared to step ii)
   iv. keeping said blend at the temperature and pressure of step iii) for a predefined period of time.
8. The process according to any of items 5 to 7, wherein the re-esterification process in step e) is done without application of a catalyst.
9. The process according to item 7, wherein the blend in step iii) is heated to at least 160° C.
10. The process according to any of items 7 to 9, wherein the blend in step iii) is heated to maximum 240° C.
11. The process according to any of items 7 to 10, wherein the glycerol and the free fatty acid mixture of step i) is mixed at a ratio of 1:3.125 or up to 1:10 (mol glycerol: mol free fatty acid) to obtain the glycerol and free fatty acid mixture blend.
12. The process according to any of the proceeding items, wherein the full process is completed in less than 24 hours, such as less than 20 hours, such as less than 15 hours, such as less than 10 hours.
13. The process according to any of items 5 to 12, wherein said vegetable fat or oil is selected from the group consisting of shea oil, sunflower oil, soybean oil, palm oil, corn oil, rapeseed oil and/or their high-oleic equivalents, coconut oil, palm kernel oil and mixtures thereof.
14. The process according to any of items 5 to 13, wherein the fatty acid composition of said vegetable fat or oil comprises 65 wt %, such as 75 wt %, such as 85 wt %, such as more than 90 wt % by weight of C18.
15. The process according to any of items 5 to 14, wherein the vegetable fat or oil is not originating from palm plants.
16. The process according to any of items 5 to 16, wherein the vegetable fat or oil is shea oil, such as shea olein obtained by fractionation of shea oil.
17. A structuring fat composition comprising the fat composition obtained by the process according to any of items 1 to 16.
18. The structuring fat composition according to item 17 wherein the structuring fat composition is further subjected to an interesterification process.
19. The structuring fat composition according to item 18, wherein said interesterification is chemical interesterification.
20. The structuring fat composition according to item 18, wherein said interesterification is enzymatic interesterification.
21. The structuring fat composition according to any of the items 17 to 20 further comprising one or more of the vegetable fats or oils selected from the group consisting of shea oil, sal oil, sunflower oil, soybean oil, palm oil, corn oil, rapeseed oil and/or their high-oleic equivalents, coconut oil, palm kernel oil and mixtures thereof.
22. The structuring fat composition according to any of the item 17 to 21, wherein said structuring fat composition comprises coconut oil.
23. The structuring fat composition according to any of the items 17 to 22, wherein said structuring fat composition does not contain palm oil or palm kernel oil.
24. A fat composition comprising at least 10 wt % stearic acid and 8 wt % of SatSatSat and which is non-hydrogenated.

25. The fat composition according to item 24, wherein the fat composition resembles an interesterified shea oil or an interesterified shea stearin.

26. A structuring fat composition comprising the fat composition of any one of items 24 to 25 and further comprising an oil comprising 20 to 90% by weight of oleic acid.

27. The structuring fat composition according to item 26, wherein the oil comprising 20 to 90% by weight of oleic acid is selected form the group consisting of shea oil, sal oil, sunflower oil, soybean oil, palm oil, corn oil, rapeseed oil and/or their high-oleic equivalent, coconut oil, palm kernel oil and mixtures thereof.

28. A fat composition and/or a structuring fat composition according to any of items 17 to 27, for use in plant-based food products, bakery, dairy, or confectionary applications.

29. A fat composition and/or a structuring fat composition according to item 28, wherein the bakery application is selected from biscuit, cake, muffin, donut, pastry, or bread applications.

30. A fat composition and/or a structuring fat composition according to any one of items 17 to 27, for use in molding, coating, enrobing, or filling chocolate or chocolate-like applications.

31. A fat composition and/or a structuring fat composition according to any one of items 17 to 27 for use as a chocolate or chocolate-like coating.

32. Use of a fat composition and/or a structuring fat composition according to any one of items 17 to 27, for plant-based food products, bakery, dairy, or confectionary applications.

33. Use of a fat composition and/or a structuring fat composition according to any one of items 17 to 27, in coating or enrobing for bakery or confectionary applications.

34. Use of a fat composition and/or a structuring fat composition according to item 32 or 33, wherein the bakery application is selected from biscuit, cake, muffin, donut, pastry, or bread applications.

35. Use of a fat composition and/or a structuring fat composition according to any one of items 17 to 27, in fillings, such as bakery fillings and confectionary fillings.

36. Use of a fat composition and/or a structuring fat composition according to any one of items 17 to 27, for chocolate or chocolate-like coating.

37. Use of a fat composition and/or a structuring fat composition according to any one of items 17 to 27, for the manufacture of a processed food product.

The invention claimed is:

1. A process for production of a fat composition comprising triglycerides, wherein the composition comprises:

a) at least 8 wt % SatSatSat triglycerides (saturated fatty acids C8-C 22), and b) at least 10 wt % stearic acid (C18:0), wherein in said process at least a part of the fatty acids making up the triglycerides present in said fat composition have been subjected to a hydrogenation step and wherein said process comprises a step of esterification and wherein none of the triglycerides in the fat composition are at any time in the process subjected to hydrogenation.

2. The process according to claim 1, wherein the content of SatSatSat triglycerides in the fat composition is at least 10 wt %.

3. The process according to claim 1, wherein the content of C16 in the fat composition is less than 50 wt %.

4. The process according to claim 1, wherein the content of stearic acid (C18:0) in the fat composition is at least 15 wt %.

5. The process according to claim 1, wherein said process further comprises the following steps:

c) Providing a vegetable fat or oil;

d) Subjecting said vegetable fat or oil to a hydrolysis process obtaining glycerol and free fatty acids;

e) Subjecting at least part of the free fatty acids from said hydrolysis process in step b) to a hydrogenation process, thereby fully saturating said free fatty acids to form a first free fatty acid mixture;

f) Adding further free fatty acids to said first free fatty acid mixture, to form a second free fatty acid mixture;

g) Re-esterifying said free fatty acid mixture of step c) and/or step d) with glycerol to form said SatSatSat triglycerides; and h) Performing a distillation process on the resulting SatSatSat triglycerides product of step e) to remove residue reactants, thereby obtaining said fat composition containing at least 10 wt % stearic acid (C18:0) and at least 8 wt % SatSatSat triglycerides.

6. The process according to claim 5, wherein the re-esterification in step g) comprises the steps of:

i. blending the glycerol and free fatty acid mixture in a container obtaining a glycerol and free fatty acid mixture blend;

ii. heating said blend under reduced pressure over a predefined period of time;

iii. further increasing the temperature and heating said blend over a predefined period of time and simultaneously lowering the pressure further compared to step ii)

iv. keeping said blend at the temperature and pressure of step iii) for a predefined period of time.

7. The process according to claim 5, wherein the re-esterification process in step g) is done without application of a catalyst.

8. The process according to claim 6, wherein the blend in step iii) is heated to at least 160° C.

9. The process according to claim 6, wherein the blend in step iii) is heated to a maximum of 240° C.

10. The process according to claim 6, wherein the glycerol and the free fatty acid mixture of step i) is mixed at a ratio of 1:3.125 or up to 1:10 (mol glycerol:mol free fatty acid) to obtain the glycerol and free fatty acid mixture blend.

11. The process according to claim 1, wherein the full process is completed in less than 24 hours.

12. The process according to claim 5, wherein said vegetable fat or oil is selected from the group consisting of shea oil, sunflower oil, soybean oil, palm oil, corn oil, rapeseed oil and/or their high-oleic equivalents, coconut oil, palm kernel oil and mixtures thereof.

13. The process according to claim 5, wherein the fatty acids of said vegetable fat or oil comprise 65 wt % by weight of C18.

14. The process according to claim 5, wherein the vegetable fat or oil is not originating from palm plants.

15. The process according to claim 5, wherein the vegetable fat or oil is shea oil.

16. A structuring fat composition comprising the fat composition obtained by the process according to claim 1.

17. The structuring fat composition according to claim 16, wherein the structuring fat composition is further subjected to an interesterification process.

18. The structuring fat composition according to claim 16, further comprising one or more of the vegetable fats or oils selected from the group consisting of shea oil, sal oil, sunflower oil, soybean oil, palm oil, corn oil, rapeseed oil and/or their high-oleic equivalents, coconut oil, palm kernel oil and mixtures thereof.

19. The structuring fat composition according to claim 16, wherein said structuring fat composition does not contain palm oil or palm kernel oil.

20. A fat composition comprising at least 10 wt % stearic acid and 8 wt % of SatSatSat and which is non-hydrogenated.

21. The fat composition according to claim 20, wherein the fat composition resembles an interesterified shea oil or an interesterified shea stearin.

22. A structuring fat composition comprising the fat composition of claim 20 and further comprising an oil comprising 20 to 90% by weight of oleic acid.

23. A structuring fat composition according to claim 16, for use in plant-based food products, bakery, dairy, or confectionary applications.

24. A structuring fat composition according to claim 16, for use in molding, coating, enrobing, or filling chocolate or chocolate-like applications.

25. A structuring fat composition according to claim 16, for use as a chocolate or chocolate-like coating.

26. A fat composition according to claim 20, for use in plant-based food products, bakery, dairy, or confectionary applications.

27. A fat composition according to claim 20, for use in molding, coating, enrobing, or filling chocolate or chocolate-like applications.

28. A fat composition according to claim 20, for use as a chocolate or chocolate-like coating.

* * * * *